United States Patent
Dede et al.

(10) Patent No.: US 11,316,174 B2
(45) Date of Patent: Apr. 26, 2022

(54) FUEL CELL STACKS AND METHODS FOR FORMING SAME FOR PROVIDING UNIFORM FLUID FLOW

(71) Applicant: TOYOTA MOTOR ENGINEERING & MANUFACTURING NORTH AMERICA, INC., Plano, TX (US)

(72) Inventors: Ercan Mehmet Dede, Ann Arbor, MI (US); Yuqing Zhou, Ann Arbor, MI (US); Tsuyoshi Nomura, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 29 days.

(21) Appl. No.: 16/746,475

(22) Filed: Jan. 17, 2020

(65) Prior Publication Data
US 2021/0226229 A1 Jul. 22, 2021

(51) Int. Cl.
*H01M 8/0258* (2016.01)
*H01M 8/2483* (2016.01)
*H01M 8/0267* (2016.01)

(52) U.S. Cl.
CPC ....... *H01M 8/0258* (2013.01); *H01M 8/0267* (2013.01); *H01M 8/2483* (2016.02)

(58) Field of Classification Search
CPC ............. H01M 8/0258; H01M 8/0267; H01M 2250/20; H01M 8/2483
See application file for complete search history.

(56) References Cited

U.S. PATENT DOCUMENTS

| | | | |
|---|---|---|---|
| 9,761,894 B2 | 9/2017 | Roshanzamir | |
| 2003/0186106 A1* | 10/2003 | Frank | H01M 8/241 429/435 |
| 2005/0181264 A1* | 8/2005 | Gu | H01M 8/0239 429/414 |
| 2009/0130523 A1* | 5/2009 | Sugiyama | H01M 8/2465 429/454 |
| 2009/0280392 A2 | 11/2009 | Andrin et al. | |
| 2010/0183930 A1* | 7/2010 | Crumm | H01M 8/04753 429/423 |
| 2010/0248059 A1 | 9/2010 | Koji et al. | |

(Continued)

FOREIGN PATENT DOCUMENTS

| | | |
|---|---|---|
| EP | 3336949 A1 | 6/2018 |
| GN | 106997956 A | 8/2017 |

*Primary Examiner* — Maria Laios
*Assistant Examiner* — Jordan E Berresford
(74) *Attorney, Agent, or Firm* — Dinsmore & Shohl LLP

(57) ABSTRACT

A fuel cell stack for providing uniform fluid flow through a plurality of plates is provided. The fuel cell stack includes a plurality of plates that define a plurality of fuel cells stacked with each other, each plate having a fuel inlet hole for receiving fuel and a fuel outlet hole for discharging fuel. The fuel cell stack includes a fuel inlet insert extending into the fuel inlet hole of at least some of the plurality of plates. The fuel inlet insert has an upstream end and a downstream end relative to a direction of fuel flow through the fuel inlet holes. The upstream end of the fuel inlet insert has a porosity and permeability less than a porosity and permeability of the downstream end of the fuel inlet insert such that the fuel insert provides uniform fuel flow through the plurality of plates.

19 Claims, 5 Drawing Sheets

(56) References Cited

U.S. PATENT DOCUMENTS

| | | | |
|---|---|---|---|
| 2012/0122008 A1* | 5/2012 | Ko | B60L 58/33 |
| | | | 429/458 |
| 2015/0263373 A1* | 9/2015 | Olabi | H01M 8/241 |
| | | | 429/458 |
| 2015/0349368 A1* | 12/2015 | Arges | H01M 8/1067 |
| | | | 429/422 |

* cited by examiner

FUEL CELL STACKS AND METHODS FOR FORMING SAME FOR PROVIDING UNIFORM FLUID FLOW

TECHNICAL FIELD

The present specification generally relates to fuel cell stacks for providing uniform performance across each fuel cell in the fuel cell stack and, more specifically, to fuel cell stacks and methods for providing uniform fluid flow through each fuel cell in the fuel cell stack.

BACKGROUND

Fuel cells are electrochemical cells that convert chemical energy of a fuel, such as hydrogen, and an oxidant, such as oxygen, into electricity. Contrary to conventional batteries in which electricity is produced by metals within the battery itself and having a finite life, fuel cells are capable of continually producing electricity so long as fuel and an oxidant are provided.

Different types of fuel cells include polymer electrolyte membrane fuel cells, phosphoric acid fuel cells, solid acid fuel cells, and alkaline fuel cells. While specific structure and operation conditions within each of the above fuel cells may differ, all fuel cells include an anode, a cathode, and an electrolyte. The electrolyte permits ions to move from one side of the fuel cell to the other. A catalyst on the anode causes fuel flowing therethrough to undergo oxidation reactions, which result in the fuel generating ions and electrons. The ions are capable of flowing through the electrolyte, but the electrons flow to the cathode through an external circuit. The flow of electrons through the external circuit results in direct current electricity.

A catalyst on the cathode causes the ions, electrons, and oxidant to react. This reaction results in water. However, a large quantity of heat is produced within the fuel cell. Excess heat generated may damage the fuel cell and, therefore, fuel cells oftentimes provide a coolant flowing therethrough in order to draw heat out of the fuel cell.

A single fuel cell produces a relatively small amount of electricity as the electrons from the fuel flow through the external circuit. Thus, multiple fuel cells can be stacked, or placed in series, to increase the amount of voltage provided. Due to fuel cells resulting in a reduced amount of waste, these fuel cell stacks are suitable for use in vehicles, including automobiles, boats, submarines, and the like.

Uniformly distributing fuel and oxidant through the fluid flow paths in each fuel cell improves the overall stack performance because the performance of a fuel cell stack is determined by the weakest fuel cell. Thus, it is preferred that each fuel cell within a fuel cell stack receives uniform fluid flow distribution throughout. However, adjusting the size of the manifold itself increases the cost and complexity of a polymer electrolyte membrane fuel cell stack.

Accordingly, a need exists for alternative fuel cell stacks for providing uniform fluid flow through a plurality of plates in the stack without adjusting a manifold extending through each plate.

SUMMARY

In one embodiment, a fuel cell stack for providing uniform fluid flow includes a plurality of plates that define a plurality of fuel cells stacked with each other. Each plate has a fuel inlet hole for receiving fuel and a fuel outlet hole for discharging fuel. The fuel cell stack also includes a fuel inlet insert extending into the fuel inlet hole of at least some of the plurality of plates. The fuel inlet insert has an upstream end and a downstream end relative to a direction of fuel flow through the fuel inlet holes. The upstream end of the fuel inlet insert has a porosity and permeability less than a porosity and permeability of the downstream end of the fuel inlet insert.

In another embodiment, a fuel cell stack for providing uniform fluid flow includes a plurality of plates that define a plurality of fuel cells stacked with each other. Each plate has a fuel inlet hole for receiving fuel and a fuel outlet hole for discharging fuel. The fuel cell stack also includes a fuel outlet insert extending into the fuel outlet hole of at least some of the plurality of plates. The fuel outlet insert has an upstream end and a downstream end relative to a direction of fuel flow through the fuel outlet holes. The upstream end of the fuel outlet insert has a porosity and a permeability greater than a porosity and a permeability of the downstream end of the fuel outlet insert.

In yet another embodiment, methods for providing uniform fluid flow within a plurality of fuel cells of a fuel cell stack comprises providing a plurality of stacked fuel cells. Each plate includes a fuel inlet hole for receiving fuel and a fuel outlet hole for discharging fuel. The method includes forming a fuel inlet insert having an upstream end and a downstream end relative to a direction of fuel flow through the fuel inlet holes. The upstream end of the fuel inlet insert has a porosity and permeability less than a porosity and permeability of the downstream end of the fuel inlet insert. The fuel inlet insert is provided within the fuel inlet hole of at least some of the plurality of plates.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
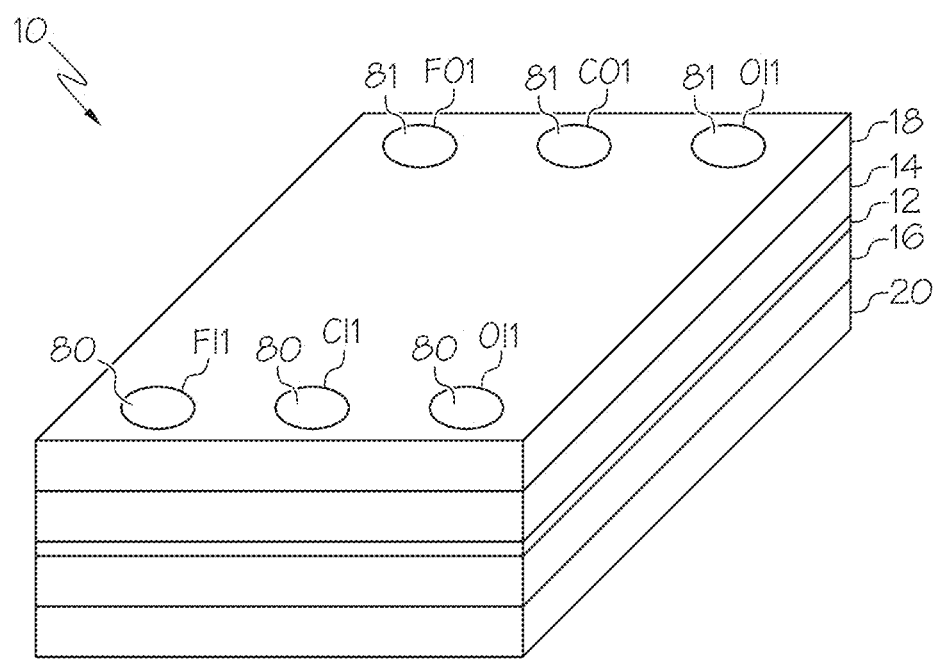
FIG. 1 depicts a perspective view of an example fuel cell according to one or more embodiments shown and described herein.

Reference will now be made in detail to embodiments of fuel cell stacks described herein, examples of which are illustrated in the accompanying drawings. Whenever possible, the same reference numerals will be used throughout the drawings to refer to the same or like parts.

Figure 2:
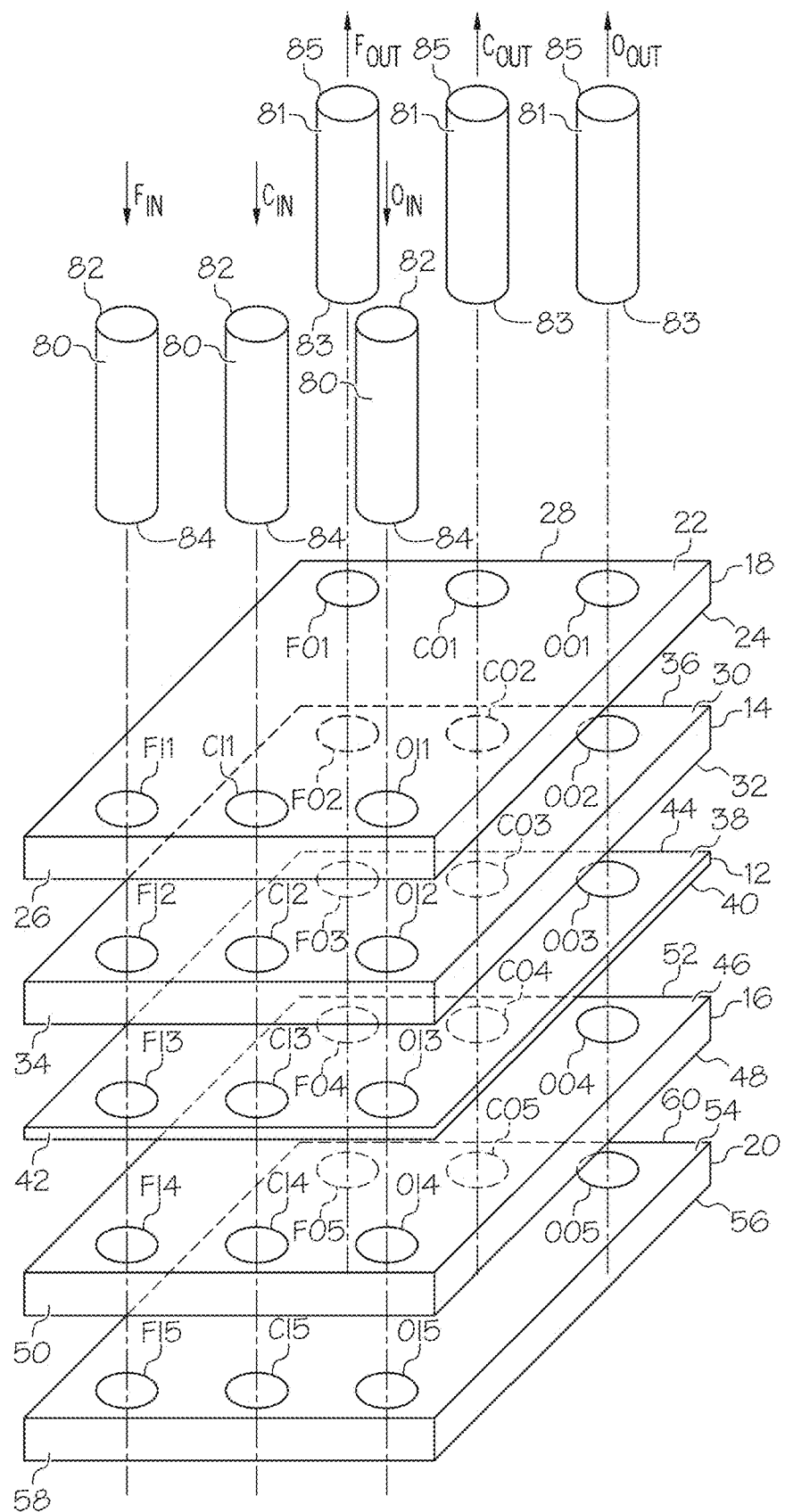
FIG. 2 depicts an exploded perspective view of the cell shown in FIG. 1 including a plurality of inlet inserts according to one or more embodiments shown and described herein.

In some embodiments, a fuel cell stack generally includes a plurality of fuel cells stacked with each other. Each fuel cell includes a plurality of plates and each plate, as shown in FIG. 2, has a fuel inlet hole for receiving fuel from a fuel supply inlet and a fuel outlet hole for discharging fuel toward a fuel supply outlet. The fuel cell stack also includes a fuel inlet insert extending into the fuel inlet hole of at least some of the plurality of plates. The fuel inlet insert has an upstream end and a downstream end relative to a direction of fuel flow through the fuel inlet hole(s). The upstream end of the fuel inlet insert has a porosity and permeability less than a porosity and permeability of the downstream end of the fuel inlet insert such that the fuel inlet insert provides uniform fuel flow through the plurality of plates.

The increased porosity and permeability of the inlet insert at the downstream end thereof provides a decreased resistance to the fuel flowing therethrough and through each of the fuel inlet holes in order to provide uniform fuel flow through each plate. It should be understood that each plate may also include a fuel outlet, as well as an inlet hole and an outlet hole for an oxidant, and an inlet hole and an outlet hole for coolant. As such, an inlet insert having an upstream end that is less porous and permeable than a downstream end may be provided within each of the inlet holes of each plate in order to further ensure uniformity of fluid flow through each plate. In addition, an outlet insert having an upstream end that is more porous and permeable than a downstream end may be provided within each of the outlet holes of each plate.

Embodiments also include methods for providing uniform fluid flow within a plurality of fuel cells of a fuel cell stack may include providing a plurality of stacked fuel cells. Each plate includes a fuel inlet hole for receiving fuel from a fuel supply inlet and a fuel outlet hole for discharging fuel toward a fuel supply outlet. The method includes forming a fuel inlet insert having an upstream end and a downstream end relative to a direction of fuel flow through the fuel inlet holes. The upstream end of the fuel inlet insert has a porosity and permeability less than a porosity and permeability of the downstream end of the fuel inlet insert. The fuel inlet insert is provided within the fuel inlet hole of each of the plurality of plates such that the fuel inlet insert provides uniform fuel flow through each of the plurality of fuel cells.

As noted above, it is to be understood that each plate may also include a fuel outlet hole, as well as an inlet hole and an outlet hole for an oxidant, and an inlet hole and an outlet hole for coolant. As such, an inlet insert having an upstream end with a porosity and permeability less than that of the downstream end may be provided within each of the inlet holes in order to ensure uniformity of the flow of fuel, oxidant, and coolant through each plate of the fuel cell stack. In addition, an outlet insert having an upstream end with a porosity and permeability greater than that of a downstream end may be provided within each of the outlet holes.

Moreover, while the fuel cell stack illustrated herein is illustrated and described herein as a proton-exchange membrane fuel cell, it should be understood that the fuel cell stack described herein may be used with other fuel cell stacks having various other configurations including, without limitation, such as phosphoric acid fuel cells, solid acid fuel cells, alkaline fuel cells, high-temperature fuel cells, and electric storage fuel cells.

All reference to "upstream" and "downstream" throughout the ensuing description is intended to be understood as being relative to a fluid flow. For example, when an insert extends through a plurality of holes, the upstream end of the insert is intended to be interpreted as meaning an end of the insert located in the opposite direction of fluid flow relative to an opposite end of the insert. Similarly, an upstream inlet or outlet hole is intended to be interpreted as meaning an inlet or outlet hole located in the opposite direction of fluid flow relative to an adjacent inlet or outlet hole.

In addition, when referring to a "plate" of a fuel cell throughout the ensuing description, it is to be understood that this may refer to a coolant plate or a bipolar plate, as well as the polymer electrolyte membrane assembly, as will be discussed in more detail herein.

Various embodiments of the fuel cell stack and the operation of the fuel cell stack will be described in more detail herein.

Referring now to HG. 1, an example fuel cell 10, specifically a polymer electrolyte membrane fuel cell, is illustrated and includes a polymer electrolyte membrane assembly 12 and a pair of bipolar plates 14, 16 on opposite sides of the polymer electrolyte membrane assembly 12. In addition, a pair of coolant plates 18, 20 may be provided on opposite sides of the fuel cell 10 for permitting a coolant to flow through the fuel cell 10 in order to draw resulting heat away from the fuel cell 10. More particularly, although not shown, it should be understood that the polymer electrolyte membrane assembly 12 may include a membrane, a catalyst layer provided on each side of the membrane, and a gas diffusion layer provided on each catalyst layer opposite the membrane. Thus, the catalyst layers and gas diffusion layers may each include an anode catalyst layer and a cathode analyst layer, as well as an anode gas diffusion layer and a cathode gas diffusion layer. A fuel flows through an anode side of the fuel cell 10 toward the polymer electrolyte membrane assembly 12 and an oxidant flows through a cathode side of the fuel cell 10 toward the polymer electrolyte membrane assembly.

The membrane is treated to only permit positively charged ions (protons) from the fuel to pass from the anode catalyst layer to the cathode catalyst layer. Electrons from the fuel is forced to pass through an external circuit interconnecting the anode catalyst layer and the cathode catalyst later.

The anode catalyst layer provided on the anode side of the membrane may include nanometer-sized platinum particles mixed with an ion-conducting polymer. The anode catalyst layer may be sandwiched between the membrane and the anode gas-diffusion layer. The cathode catalyst layer may be provided on the cathode side of the membrane and may include nanometer-sized platinum particles mixed with an ion-conducting polymer. The cathode catalyst may allow the protons flowing through the membrane from the fuel to react with the oxidant in order to produce water.

The gas diffusion layers may be provided on an outer surface of the catalyst layers opposite the membrane and transport the fuel and the oxidant into the respective catalyst layer. In some embodiments, each gas diffusion layer is formed from carbon paper coated with polytetrafluoroethylene.

Still referring to FIG. 1, the fuel cell 10 is illustrated including the pair of bipolar plates 14, 16, particularly a fuel or anode bipolar plate 14 on the anode side of the polymer electrolyte membrane assembly 12 and an oxidant or cathode bipolar plate 16 on the cathode side of the polymer electrolyte membrane assembly 12. A pair of coolant plates 18, 20 are shown as being provided on opposite sides of the bipolar plates 14, 16. However, it is to be understood that a coolant plate may be positioned between any two adjacent fuel cells in a fuel stack. Thus, any one fuel cell may have one, two, or no coolant plates on opposite sides thereof if weight reduction is preferred over drawing heat away from each fuel cell.

Referring now to FIG. 2, an exploded view of the fuel cell is illustrated. In an embodiment, as shown therein, the fuel cell 10 includes the pair of coolant plates 18, 20, the bipolar plates 14, 16, and the polymer electrolyte membrane assembly 12. Each plate 12-20 includes coaxial inlet holes and coaxial outlet holes for allowing a fluid, such as fuel, oxidant, or coolant, to flow through to an adjacent plate.

The anode coolant plate 18, which is provided on the anode side of the fuel cell, has a first surface 22, an opposite second surface 24, a first end 26, and an opposite second end 28. The anode coolant plate 18 includes a fuel inlet hole FI1, an oxidant inlet hole OI1, and a coolant inlet hole CI1 provided proximate the first end 26 thereof. In addition, the anode coolant plate 18 includes a fuel outlet hole FO1, an oxidant outlet hole OO1, and a coolant outlet hole CO1 provided proximate a second end 28 thereof. It is to be understood that the anode coolant plate 18 includes a coolant flow path (e.g., channel) formed in either the first surface 22 or the second surface 24 thereof and provides a pathway for interconnecting the coolant inlet hole CI1 and the coolant outlet hole CO1 on the anode coolant plate 18.

Figure 3:
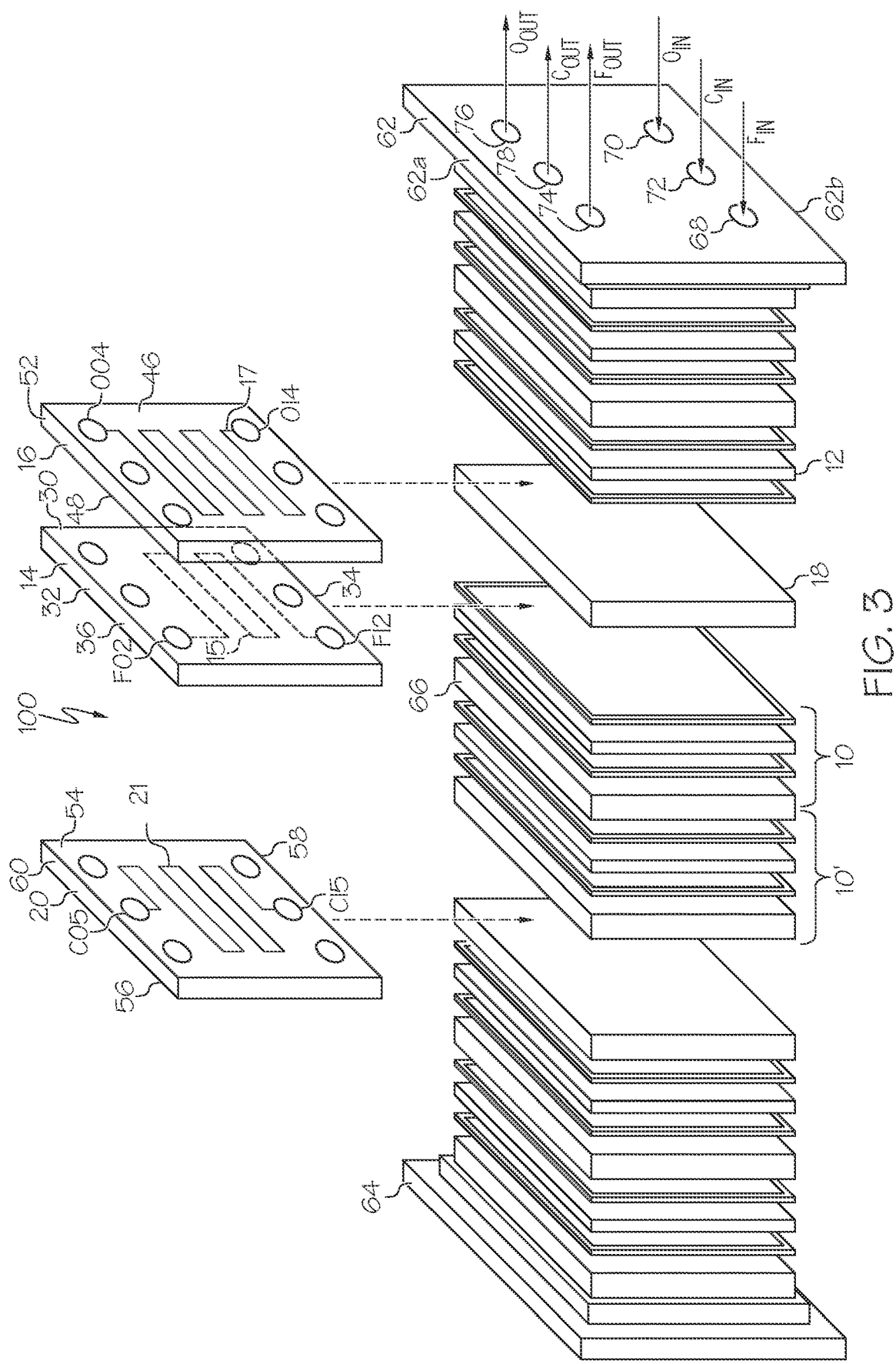
FIG. 3 depicts an exploded perspective view of an example fuel cell stack including a plurality fuel cells according to one or more embodiments shown and described herein.

The anode bipolar plate 14, which is provided on the anode side of the fuel cell 10, has a first surface 30, an opposite second surface 32, a first end 34, and an opposite second end 36. The anode bipolar plate 14 includes a fuel inlet hole FI2, an oxidant inlet hole OI2, and a coolant inlet hole CI3 provided proximate the first end 34 thereof. In addition, the anode bipolar plate 14 includes a fuel outlet hole FO2, an oxidant outlet hole OO2, and a coolant outlet hole CO2 provided proximate a second end 36 thereof. As shown in FIG. 3, it is to be understood that the anode bipolar plate 14 includes a fuel flow path (e.g., channel) 15 formed in the second surface 32 thereof and provides a pathway for interconnecting the fuel inlet hole FI2 and the fuel outlet hole FO2 on the anode bipolar plate 14.

The polymer electrolyte membrane assembly 12, discussed herein, has a first surface 38, an opposite second surface 40, a first end 42, and an opposite second end 44. The polymer electrolyte membrane assembly 12 includes a fuel inlet hole FI3, an oxidant inlet hole OI3, and a coolant inlet hole CI3 provided proximate the first end 42 thereof. In addition, the polymer electrolyte membrane assembly 12 includes a fuel outlet hole FO3, an oxidant outlet hole OO3, and a coolant outlet hole CO3 provided proximate the second end 44 thereof. In some embodiments, the polymer electrolyte membrane assembly 12 may be dimensionally smaller than the anode bipolar plate 14 and the cathode bipolar plate 16 and, thus, not require inlet and outlet holes since the fluids are capable of flowing around.

The cathode bipolar plate 16, which is provided on the cathode side of the fuel cell 10, has a first surface 46, an opposite second surface 48, a first end 50, and an opposite second end 52. The cathode bipolar plate 16 includes a fuel inlet hole 114, an oxidant inlet hole OI4, and a coolant inlet hole CI4 provided proximate the first end 50 thereof. In addition, the cathode bipolar plate 16 includes a fuel outlet hole FO4, an oxidant outlet hole OO4, and a coolant outlet hole CO4 provided proximate the second end 52 thereof. As shown in FIG. 3, it is to be understood that the cathode bipolar plate 16 includes an oxidant flow path (e.g., channel) 17 formed in the first surface 46 thereof and provides a pathway for interconnecting the oxidant inlet hole OI4 and the oxidant outlet hole OO4.

The cathode coolant plate 20, which is provided on the cathode side of the fuel cell 10, has a first surface 54, an opposite second surface 56, a first end 58, and an opposite second end 60. The cathode coolant plate 20 includes a fuel inlet hole FI5, an oxidant inlet hole OI5, and a coolant inlet hole CI5 provided proximate the first end 58 thereof. In addition, the cathode coolant plate 20 includes a fuel outlet hole FO5, an oxidant outlet hole OO5, and a coolant outlet hole CO5 provided proximate the second end 60 thereof. It is to be understood that the cathode coolant plate 20 includes a coolant flow path (e.g., channel) 21 formed in either the first surface 54 or the second surface 56 thereof and provides a pathway for interconnecting the coolant inlet hole CI5 and the coolant outlet hole CO5 on the anode coolant plate 20.

However, as discussed herein, a coolant plate does not need to be provided on both sides of a fuel cell and between each adjacent pair of fuel cells in a fuel cell stack. In some embodiments, when two fuel cells abut against one another with no intervening coolant plate, the bipolar plate between each fuel cell may include both a fuel flow path and an oxidant flow path. More particularly, the fuel flow path may be formed on one surface of the bipolar plate facing an anode side of the polymer electrolyte membrane assembly and the oxidant flow path may be on an opposite surface of the bipolar plate facing a cathode side of the polymer electrolyte membrane assembly, thereby reducing number of plates in a fuel cell stack.

Due to each fuel cell 10 providing about 0.5 volts to about 1 volt of energy, a plurality of fuel cells 10 may be arranged between a pair of end plates 62, 64 to form the fuel cell stack 100, as shown in FIG. 3. In this illustrated embodiment, a pair of fuel cells 10, 10' are provided between a pair of cooling plates 18, 20. As such, it is to be understood that the bipolar plate 66 between two adjacent fuel cells 10, 10' includes an oxidant flow path provided on the first surface of the bipolar plate and a fuel flow path provided on the second surface of the bipolar plate.

The example fuel cell stack 100 illustrated by FIG. 3 is in a U-configuration such that fluid flows through the first end of each plate in a first fluid flow direction and out of the opposite second end of the same plate in an opposite second fluid flow direction. Each fuel inlet hole FI1-FI5 is coaxial with one another to permit fuel flow through the fuel cell stack 100. Similarly, each fuel outlet hole FO1-FO5 is coaxial, each oxidant inlet hole OI1-OI5 is coaxial, each oxidant outlet hole OO1-OO5 is coaxial, each coolant inlet hole CI1-CI5 is coaxial, and each coolant outlet hole CO1-CO5 is coaxial. The U-configuration requires fluid supply inlets and fluid supply outlets to be provided in the same end plate. As shown in FIG. 3, one end plate 62 has a fuel supply inlet 68 for fuel entering Fin the fuel cell stack 100, an oxidant supply inlet 70 for oxidant entering Oin the fuel cell stack 100, and a coolant supply inlet 72 for coolant entering Cin the fuel cell stack 100 provided proximate a first end 62a of the end plate 62. Additionally, the end plate 62 has a fuel supply outlet 74 for fuel exiting Fout the fuel cell stack 100, an oxidant supply outlet 76 for oxidant exiting Omit the fuel cell stack 100, and a coolant supply outlet 78 for coolant exiting Cout the fuel cell stack 100 provided proximate a second end 62b of the end plate 62.

This is contrary to the fluid supply inlets being provided in one end plate and the fluid supply outlets being provided in the other end plate as would be provided in a Z-configuration. However, it is to be understood that, in some embodiments, the fuel cell stack 100 has a Z-configuration or a global flow configuration without departing from the scope of the present disclosure. In an embodiment in which a fuel cell stack is arranged in a Z-configuration, the fluid flows through each of the inlet and outlet holes from one end plate to the other end plate. Furthermore, it is understood that each of the plates does not need to include each inlet hole on the same end of the plate and opposite each outlet hole. Instead, a fuel inlet hole may be provided on an opposite end of a plate as an oxidant inlet if fuel and oxidant are being provided into the fuel cell stack from opposite end plates (i.e., directions). While the fuel cell stack shown in FIG. 3 only has six fuel cells 10, it is understood that a fuel cell stack may include any number of fuel cells. In some embodiments, the fuel cell stack 100 has a length of about 0.3 meters to about 0.6 meters. More particularly, the fuel cell stack 100 has a length of about one half meter.

In some embodiments, an inlet insert 80 may extend into at least a subset of the inlet holes of the plates 12, 14, 16, 18, 20 and an outlet insert 81 may extend into at least a subset of the outlet holes of the plates 12, 14, 16, 18, 20. However, referring again to FIG. 2, some embodiments of a fuel cell 10 of the fuel cell stack 100 includes an inlet insert 80 provided within each of the inlet holes of the plates 12, 14, 16, 18, 20 and an outlet insert 81 provided within each of the outlet holes of the plates 12, 14, 16, 18, 20. It is to be understood that each inlet insert 80 extends through a series of coaxial inlet holes of each plate 12, 14, 16, 18, 20 in the fuel cell stack 100, thus extending from one end plate 62 to an opposite end plate 64. Similarly, each outlet insert 81 extends through a series of coaxial outlet holes of each plate 12, 14, 16, 18, 20. In addition, it is to be understood that the fuel cell stack 100 may include as few as one inlet insert 80 extending through a series of coaxial inlet holes. For example, one inlet insert 80 may be provided extending through the fuel inlet holes FI1-FI5 in the fuel cell stack 100. In some embodiments, because each inlet insert 80 extends the entire length between opposite end plates 62, 64, the length of each inlet insert 80 is about one foot to about two feet. Another non-limiting example, each inlet insert 80 has a length of about one half meter.

Figure 4:
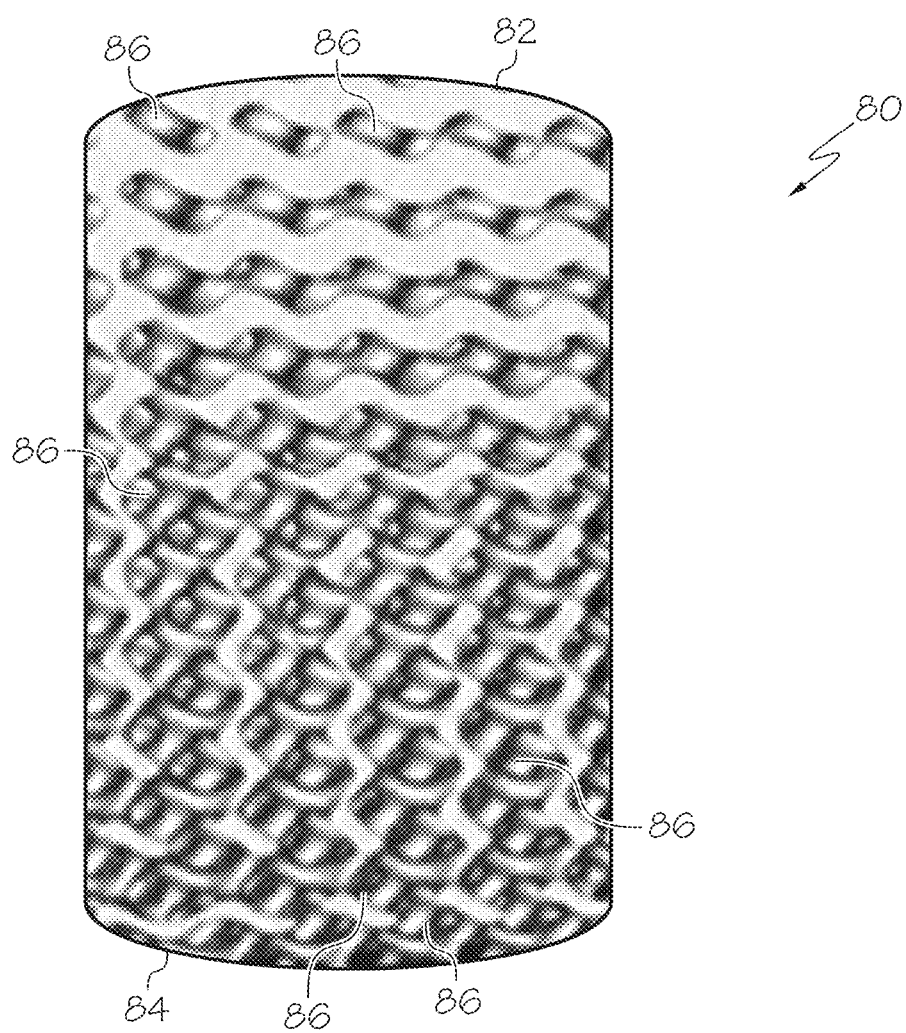
FIG. 4 depicts a perspective view of the example inlet insert shown in FIG. 2 according to one or more embodiments shown and described herein.

One of the inlet inserts 80 illustrated in FIG. 2 is shown in FIG. 4 and now described in more detail herein. The inlet insert 80 is an elongated member having a first end 82 and the second end 84. As will be discussed in more detail herein, the first end 82 is also referred to as the upstream end when placed within the fuel cell stack 100 relative to a direction of fluid flow through the inlet holes in which the inlet insert 80 is positioned. Similarly, the second end 84 is also referred to as the downstream end when placed within the fuel cell stack 100 relative to a direction of fluid flow through the inlet holes in which the inlet insert 80 is positioned.

More particularly, the inlet insert 80 has a plurality of pores 86 that define a porosity and permeability of the inlet insert 80 in which the first, or upstream, end 82 has a porosity and permeability less than a porosity and permeability of the second, or downstream, end 84. In some embodiments the inlet insert 80 is functionally graded such that the porosity and permeability of the inlet insert 80 gradually changes from the first end 82 to the second end 84. The porosity and permeability may be adjusted along the length of the inlet insert 80 by increasing the number of pores 86 along the width of the inlet insert 80 or by increasing the size of the pores 86 themselves. In some embodiments, the inlet insert 80 is a functionally graded metal foam, such as aluminum. In other embodiments, the inlet insert 80 is a functionally graded ceramic.

In some embodiments the inlet insert 80 is formed such that the porosity and permeability of the inlet insert 80 is adjusted specifically at the inlet holes of each plate 12, 14, 16, 18, 20 to provide incrementally increasing porosity and permeability. In this embodiment, the porosity and permeability of the inlet insert 80 may not be adjusted in a continual manner or in a linear direction. Instead, the permeability and porosity of the inlet insert 80 may increase or decrease between each plate 12, 14, 16, 18, 20. As such, the degree of porosity and permeability of the inlet insert 80 is adjusted in a non-linear, constant manner with respect to the distance between the inlet holes, the fluid velocity, and the configuration of the stack 100. Thus, reference to the porosity and permeability of the inlet insert 80 increasing from the first end 82 toward the second end 84 should be understood that the increasing porosity and permeability is not necessarily linear and constant and may only be increasing at the inlet holes.

When in use, as discussed in more detail below, fluid passes through the inlet insert 80 from the first end 82 toward the second end 84. As the porosity and permeability increases, fluid resistance flowing through the inlet insert 80 decreases. As such, the porosity and the permeability of the inlet insert 80 is configured to achieve a more balanced static pressure and pressure distribution in order to provide a more uniform fluid flow.

The inlet insert 80 may have any suitable cross-sectional geometry depending on the shape of the holes such as a cylinder, square, or irregular polygon. Nevertheless, the width of the inlet insert 80 is dimensioned to extend across the entire diameter of the associated inlet holes, or manifold if provided, in which the inlet insert 80 is positioned. Thus, in some embodiments, the width of the inlet insert 80 is at least as wide as the diameter of the associated inlet holes.

In the present embodiment in which the fuel cell stack 100 is in a U-configuration, it is to be understood that the outlet insert 81 is substantially similar to the inlet insert 80 except for the fact that the porosity and permeability extending through the outlet insert 81 is reversed. Specifically, the outlet insert 81 has an upstream or first end 83 having a porosity and permeability greater than a downstream or second end 85. Thus, as will be discussed in more detail herein, the inlet insert 80 provides an increasing porosity and permeability as fluid flows through the inlet holes, thereby decreasing fluid resistance in the direction of fluid flow, and the outlet insert 81 provides a decreasing porosity and permeability as fluid flows through the outlet holes, thereby increasing fluid resistance in the direction of fluid flow.

Similar to the inlet insert 80 discussed above, in some embodiments, the outlet insert 81 is functionally graded such that the porosity and permeability of the outlet insert 81 gradually changes from the first end 83 to the second end 85. The porosity and permeability max be adjusted along the length of the outlet insert 81 by decreasing the number of pores along the width of the outlet insert 81 or by decreasing the size of the pores themselves. In some embodiments, the outlet insert 81 is a functionally graded metal foam, such as aluminum. In other embodiments, the outlet insert 81 is a functionally graded ceramic.

In some embodiments the outlet insert 81 is formed such that the porosity and permeability of the outlet insert 81 is adjusted specifically at the outlet holes of each plate 12, 14, 16, 18, 20. In this embodiment, the porosity and permeability of the outlet insert 81 may not be adjusted in a continual manner or in a linear direction. Instead, the permeability and porosity of the outlet insert 81 may increase or decrease between each plate 12, 14, 16, 18, 20. As such, the degree of porosity and permeability of the outlet insert 81 is adjusted in a non-linear, constant manner with respect to the distance between the inlet holes, the fluid velocity, and the configuration of the stack 100. Thus, reference to the porosity and permeability of the outlet insert 81 decreasing from the first end 83 toward the second end 85 should be understood that the decreasing porosity and permeability is not necessarily linear and constant.

When in use, as discussed in more detail below, fluid passes through the outlet insert 81 from the first end 83 toward the second end 85. As the porosity and permeability decreases, fluid resistance flowing through the outlet insert 81 increases. As such, the porosity and the permeability of the outlet insert 81 is configured to achieve a more balanced static pressure and pressure distribution in order to provide a more uniform fluid flow.

As shown in FIG. 2, in use, the inlet insert 80 is positioned within each series of coaxial inlet holes and the outlet insert 81 is positioned within each series of coaxial outlet holes. With respect to the inlet inserts 80 positioned within the inlet holes, it is to be understood that the first end 82 of each insert 80 is positioned proximate the end plate 62 which includes the fluid supply inlet 68, 70, 72 for that associated hole. Thus, the second end 84 of each inlet insert 80 is positioned opposite the fluid supply inlet 68, 70, 72 for that associated hole. Similarly, with respect to the outlet inserts 81 positioned within the outlet holes, it is to be understood that the second end 85 of each outlet insert 81 is positioned proximate the end plate 62 including the fluid supply outlet 74, 76, 78 for that associated hole. Thus, the first end 83 of each outlet insert 81 is positioned opposite the fluid supply outlet 74, 76, 78 for that associated hole.

As a result, when fluid flows from the first end 82 of the inlet insert 80 toward the second end 84 of the inlet insert 80, fluid resistance decreases, thereby pushing the fluid in a transverse or perpendicular direction into a flow path provided in the plates. Without increasing the porosity and permeability of the inlet insert 80 toward the second end 84 and in the downstream direction, fluid resistance would not decrease and the static pressure therein would be unbalanced. Thus, by decreasing the fluid resistance through each series of coaxial inlet holes, uniform fluid flow may be provided in the fluid flow paths and across each plate 12, 14, 16, 18, 20. Specifically, the inlet insert 80 extending through the fuel inlet hole FI1-FI5 of each plate 12, 14, 16, 18, 20 with a porosity and permeability at the first end 82 less than that compared to the porosity and permeability at the second end 84 provides uniform fuel flow through each of the fuel flow paths and, thus, through the anode bipolar plate 14. The inlet insert 80 extending through the oxidant inlet hole OI1-OI5 of each plate 12, 14, 16, 18, 20 with a porosity and permeability at the first end 82 less than that compared to the porosity and permeability at the second end 84 provides uniform oxidant flow through each of the oxidant flow paths and, thus, through the cathode bipolar plate 16. The inlet insert 80 extending through the coolant inlet hole CI1-CI5 of each plate 12, 14, 16, 18, 20 with a porosity and permeability at the first end 82 less than that compared to the porosity and permeability at the second end 84 provides uniform coolant flow through each of the coolant flow paths and, thus, through the coolant plates 18, 20. The opposite can be said with respect to the outlet insert 81 extending through the fuel outlet holes FO1-FO5, the oxidant outlet holes OO1-OO5, and the coolant outlet holes CO1-OO5 as well. In other words, when the outlet insert 81 is provided in any of the outlet holes, the porosity and permeability decreases from the first or upstream end 83 toward the second or downstream end 85.

In some embodiments, the inlet insert 80 and the outlet insert 81 is a 3D printed insert comprising a plurality of individual insert segments that are 3D printed and provided directly within coaxial inlet or outlet holes of at least some of the plates. The 3D printed insert may also be printed directly within the inlet or outlet holes. In doing so, each segment of the 3D printed inlet insert is fabricated such that an upstream end or inlet insert segment has a porosity and permeability less than any downstream end or insert segment. Thus, decreased fluid resistance is still provided as fluid flows in a downstream direction through coaxial inlet holes. With respect to the outlet insert 81, each segment of the 3D printed outlet insert is fabricated such that an upstream end or outlet insert segment has a porosity and permeability greater than any downstream end or outlet insert segment.

Figure 5:
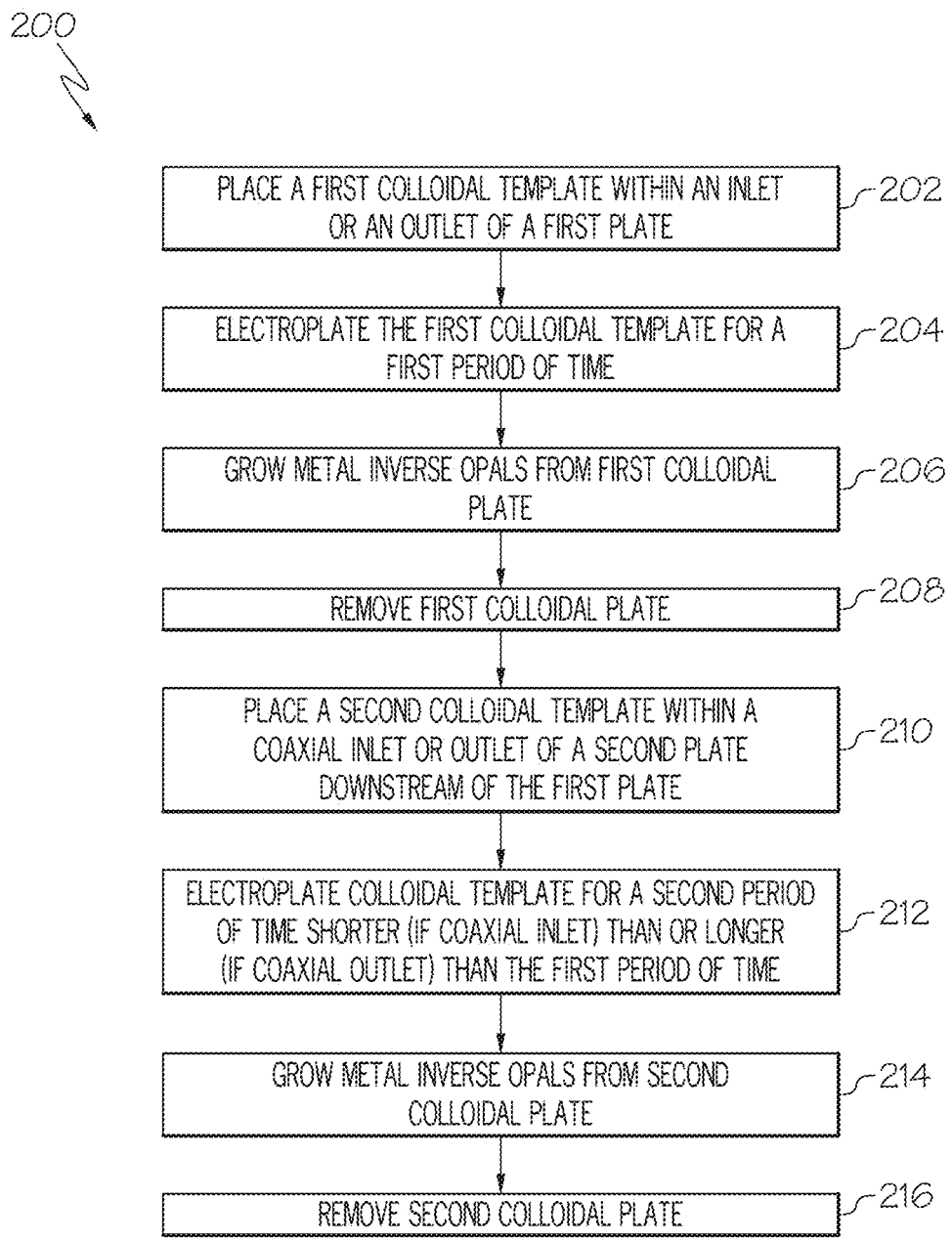
FIG. 5 depicts a flowchart of an example method for forming an inlet insert within each plate of a fuel cell stack according to one or more embodiments shown and described herein.

In some embodiments, the inlet insert 80 and the outlet insert 81 comprises a plurality of individual segments that are formed by a metal inverse opal (MIO) structure, and more particularly, a plurality of coaxial MIO structures. Referring to FIG. 5, an example method 200 for forming each of the MIO structures will be described. It should be understood that the method 200 is merely illustrative and that the inlet insert 80 and the outlet insert 81 may be formed in various other methods. Initially, at step 202, a colloidal template is deposited within an inlet or outlet hole of a first plate. In some embodiments, the colloidal template may be bonded to the plate. The colloidal template includes a top surface and a bottom surface. In this instance, the plate and the colloidal template may be bonded together by an intermediary bonding layer disposed therebetween.

In some embodiments, the colloidal template is a polystyrene structure formed of a plurality of polymer spheres extending between the top surface and the bottom surface. The structure of the colloidal template may be formed of a plurality of polystyrene spheres forming a plurality of pores and/or voids disposed between the plurality of polymer spheres. The plurality of polymer spheres are sized and shaped to form an interconnected network of pores and/or voids throughout the colloidal template. The plurality of polymer spheres is configured to receive a metal therethrough. As step 204, the metal may be electroplated onto the colloidal template for a first period of time.

The metal may be formed from any electrically conductive material, such as, for example, copper (Cu), aluminum (Al), nickel (Ni), iron (Fe), zinc (Zn), alloys thereof, and the like. As used herein, the term "alloys thereof" refers to alloys not limited to the elements listed unless otherwise stated. For example, a Cu alloy as disclosed herein may include an alloy formed from Cu and elements other than Al, Ni, Fe, and Zn. In the alternative, a Cu alloy as disclosed herein may include an alloy formed from Cu with Al, Ni, Fe and/or Zn, plus additional elements. In another alternative, a Cu alloy as disclosed herein may include an alloy formed from only Cu and Al, Ni, Fe and/or Zn plus any incidental impurities present from manufacturing of the Cu alloy. With the metal received within the plurality of pores of the colloidal template, metal inverse opals are effectively grown at step 206.

The colloidal template is removed from the plate at step 208 to form the MIO structure within the associated hole of the plate. It should be understood that the colloidal template may be removed from the assembly via various methods, including but not limited to, dissolving the colloidal template with a solution to thereby uncover the MIO structure formed within the porous structure of the colloidal template. In this instance, the MIO structure is provided within the hole of the plate.

The amount of porosity and permeability of the MIO structure can be varied during fabrication by changing the size of the plurality of polymer spheres of the colloidal template. Further, the size of the plurality of pores and/or voids of the MIO structure may be varied as a function of the thickness of the MIO structure such that a graded porosity and permeability, i.e. graded hollow pore diameter, is provided as a function of thickness. The size (diameter) of the plurality of pores and/or voids may vary.

It should be appreciated that in some embodiments, side portions of the MIO structure may be etched to remove any overhang portions of the MIO structure that exceed a diameter of the hole of the plate in which the MIO structure is formed within. It should be understood that the removal of any overhangs is merely optional such that, in some embodiments, the bonding assembly may include the MIO structure having the side portions extending beyond the hole in the plate, thereby forming the overhang portion(s) while in other embodiments, the overhangs are removed. In addition, the MIO structure may be any inverse opal structure, such as, a copper inverse opal (CIO) structure or a nickel inverse opal (NIO) structure or titanium.

With respect to the formation of the MIO structure forming one individual segment of the insert, additional MIO structures may be formed within at least some of the coaxial holes by repeating steps 202-208 at steps 210-216 for each subsequent downstream inlet or outlet hole in order to form a segmented insert. In some embodiments, additional or substitute MIO structures are formed within each coaxial hole to form a segmented insert extending the entire length of the fuel cell stack. Each of the MIO structures may be formed within the holes simultaneously using a continuous template that is inserted into the entire stack. In addition, each MIO structure provided in an inlet hole is fabricated to have a varying porosity and permeability such that each subsequent downstream MIO structure is incrementally more porous and permeable as compared to an immediately upstream MIO structure. This may be done by electroplating each downstream colloidal template for a second period of time less than the first period of tune. Thus, the resistance of fluid flow through each hole in a downstream flow direction is decreased in order to provide uniform fluid flow through each plate. With respect to each MIO structure provided in an outlet hole, each MIO structure is fabricated to have a varying porosity and permeability such that each subsequent downstream MIO structure is incrementally less porous and permeable as compared to an immediately upstream MIO structure. This may be done by electroplating each downstream colloidal template for a second period of time greater than the first period of time. In some embodiments, the MIO structures can alternatively be grown in a sheet or larger three-dimensional plug, cut to size, and then inserted into the holes.

From the above, it is to be appreciated that defined herein is a new and unique fuel cell stack and method for forming same in which the fuel cell stack includes a plurality of plates configured to provide uniform fluid flow either by providing an insert extending through a series of coaxial inlet or outlet holes formed therein.

It is noted that the term "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fuel cell stack for providing uniform fluid flow comprising:
   a plurality of plates that define a plurality of fuel cells stacked with each other, each plate having a fuel inlet hole for receiving fuel and a fuel outlet hole for discharging fuel;
   a fuel inlet insert extending into the fuel inlet hole of at least some of the plurality of plates, the fuel inlet insert having an upstream end and a downstream end relative to a direction of fuel flow through the fuel inlet holes, the upstream end of the fuel inlet insert having a porosity and a permeability less than a porosity and a permeability of the downstream end of the fuel inlet insert; and
   a fuel outlet insert extending into the fuel outlet hole of at least some of the plurality of plates, the fuel outlet insert having an upstream end and a downstream end relative to a direction of fuel flow through the fuel outlet holes, the upstream end of the fuel outlet insert having a porosity and a permeability greater than a porosity and a permeability of the downstream end of the fuel outlet insert.

2. The fuel cell stack of claim 1, wherein each plate has an oxidant inlet hole for receiving oxidant and an oxidant outlet hole for discharging oxidant, the fuel cell stack further comprising:
   an oxidant inlet insert extending into the oxidant inlet hole of at least some of the plurality of plates, the oxidant inlet insert having an upstream end and a downstream end relative to a direction of oxidant flow through the oxidant inlet holes, the upstream end of the oxidant inlet insert having a porosity and a permeability less than a porosity and a permeability of the downstream end of the oxidant inlet insert.

3. The fuel cell stack of claim 2, wherein each plate has a coolant inlet hole for receiving oxidant and a coolant outlet hole for discharging coolant, the fuel cell stack further comprising:
   a coolant inlet insert extending into the coolant inlet hole of at least some of the plurality of plates, the coolant inlet insert having an upstream end and a downstream end relative to a direction of coolant flow through the coolant inlet holes, the upstream end of the coolant inlet insert having a porosity and a permeability less than a porosity and a permeability of the downstream end of the coolant inlet insert.

4. The fuel cell stack of claim 3 further comprising a pair of end plates, the plurality of fuel cells stacked between the pair of end plates.

5. The fuel cell stack of claim 3, wherein at least one of the fuel inlet insert, the oxidant inlet insert, and the coolant inlet insert is functionally graded.

6. The fuel cell stack of claim 5, wherein at least one of the fuel inlet insert, the oxidant inlet insert, and the coolant inlet insert is a functionally graded metal foam.

7. The fuel cell stack of claim 5, wherein at least one of the fuel inlet insert, the oxidant inlet insert, and the coolant inlet insert is a functionally graded ceramic.

8. The fuel cell stack of claim 3, wherein at least one of the fuel inlet insert, the oxidant inlet insert, and the coolant inlet insert comprises individual 3D printed segments within coaxial inlet holes of the fuel cell stack.

9. The fuel cell stack of claim 3, wherein at least one of the fuel inlet insert, the oxidant inlet insert, and the coolant inlet insert comprises individual segments formed by a metal inverse opal structure within coaxial inlet holes.

10. The fuel cell stack of claim 3 further comprising:
an oxidant outlet insert extending into the oxidant outlet hole of at least some of the plurality of plates, the oxidant outlet insert having an upstream end and a downstream end relative to a direction of oxidant flow through the oxidant outlet holes, the upstream end of the oxidant outlet insert having a porosity and a permeability greater than a porosity and a permeability of the downstream end of the oxidant outlet insert; and
a coolant outlet insert extending into the coolant outlet hole of at least some of the plurality of plates, the coolant outlet insert having an upstream end and a downstream end relative to a direction of coolant flow through the coolant outlet holes, the upstream end of the coolant outlet insert having a porosity and a permeability greater than a porosity and a permeability of the downstream end of the coolant outlet insert.

11. The fuel cell stack of claim 10, wherein each inlet insert and each outlet insert has a length of about one half meter.

12. A fuel cell stack for providing uniform fluid flow comprising:
a plurality of plates that define a plurality of fuel cells stacked with each other;
an inlet insert extending into an inlet hole of at least some of the plurality of plates, the inlet insert having an upstream end and a downstream end relative to a direction of fluid flow through the inlet holes, the upstream end of the inlet insert having a porosity and a permeability greater than a porosity and a permeability of the downstream end of the inlet insert; and
an outlet insert extending into an outlet hole of at least some of the plurality of plates, the outlet insert having an upstream end and a downstream end relative to a direction of fluid flow through the outlet holes, the upstream end of the outlet insert having a porosity and a permeability greater than a porosity and a permeability of the downstream end of the outlet insert.

13. The fuel cell stack of claim 12, wherein the inlet insert is one of a fuel inlet insert, an oxidant inlet insert, and a coolant inlet insert, and the outlet insert is one of a fuel outlet insert, an oxidant outlet insert, and a coolant outlet insert.

14. The fuel cell stack of claim 12, wherein at least one of the fuel inlet insert and the outlet insert is functionally graded.

15. A method for providing uniform fluid flow within a plurality of fuel cells of a fuel cell stack, the method comprising:
providing a plurality of stacked fuel cells, each fuel cell including a plurality of plates having a fuel inlet hole for receiving fuel and a fuel outlet hole for discharging fuel; and
forming a fuel inlet insert having an upstream end and a downstream end relative to a direction of fuel flow through the fuel inlet holes, the upstream end of the fuel inlet insert having a porosity and a permeability less than a porosity and a permeability of the downstream end of the fuel inlet insert;
forming a fuel outlet insert having an upstream end and a downstream end relative to a direction of fuel flow through the fuel outlet holes, the upstream end of the fuel inlet insert having a porosity and a permeability greater than a porosity and a permeability of the downstream end of the fuel outlet insert;
providing the fuel inlet insert within the fuel inlet hole of at least some of the plurality of plates; and
providing the fuel outlet insert within the fuel outlet hole of at least some of the plurality of plates.

16. The method of claim 15, wherein the fuel inlet insert is a functionally graded metal foam.

17. The method of claim 15, wherein the fuel inlet insert comprises 3D printed segments within coaxial inlet holes of at least some of the plurality of plates.

18. The method of claim 15, wherein the fuel inlet insert has a length of about one half meter.

19. The method of claim 15, wherein forming the fuel inlet insert further comprises:
placing a colloidal template including a plurality of polymer spheres within the fuel inlet hole of at least some of the plurality of plates;
electroplating the colloidal template within the fuel inlet hole of a first plate for a first period of time;
electroplating the colloidal template within the fuel inlet hole of a second plate downstream of the first plate relative to fuel flow through the fuel inlet holes for a second period of time less than the first period of time such that the fuel inlet hole of the second plate is less porous and permeable than the fuel inlet hole of the first plate; and
dissolving the colloidal template.

* * * * *

UNITED STATES PATENT AND TRADEMARK OFFICE
CERTIFICATE OF CORRECTION

PATENT NO. : 11,316,174 B2
APPLICATION NO. : 16/746475
DATED : April 26, 2022
INVENTOR(S) : Ercan Mehmet Dede, Yuqing Zhou and Tsuyoshi Nomura It is certified that error appears in the above-identified patent and that said Letters Patent is hereby corrected as shown below:

In the Specification

In Column 5, Line 61, delete "114" and insert --FI4--, therefor.

In Column 6, Line 60, delete "Omit" and insert --Oout--, therefor.

In Column 8, Line 55, delete "max" and insert --may--, therefor.

In the Claims

In Column 14, Line 06, Claim 14, after "of the", delete "fuel".

Signed and Sealed this
Fifth Day of July, 2022

Katherine Kelly Vidal
*Director of the United States Patent and Trademark Office*